United States Patent [19]
Schiro

[11] Patent Number: 4,666,115
[45] Date of Patent: May 19, 1987

[54] PLANT HANGER

[76] Inventor: Jeffrey C. Schiro, 159 Hoyt St., Brooklyn, N.Y. 11217

[21] Appl. No.: 826,237

[22] Filed: Feb. 5, 1986

[51] Int. Cl.$^4$ ............................................. F16B 5/06
[52] U.S. Cl. ............................ 248/225.1; 248/225.2; 47/67
[58] Field of Search ............... 248/225.1, 222.1, 225.2, 248/220.2, 220.3, 220.4, 235, 239, 241, 242; 47/67

[56] References Cited

U.S. PATENT DOCUMENTS

| | | | |
|---|---|---|---|
| 2,553,960 | 5/1951 | Swart | 248/239 UX |
| 2,605,074 | 7/1952 | Bucsko et al. | 248/235 |
| 2,812,150 | 11/1957 | Winterhoff | 248/225.1 |
| 3,669,395 | 6/1972 | Gehrke | 248/235 |
| 3,853,293 | 12/1974 | Larson | 248/221.1 |
| 4,434,960 | 3/1984 | Berry | 248/220.4 |

FOREIGN PATENT DOCUMENTS 0078176 4/1983 European Pat. Off. ............ 248/235

Primary Examiner—Ramon O. Ramirez
Attorney, Agent, or Firm—Richard L. Miller

[57] ABSTRACT

A hanger for plants on fences and other surfaces is provided. The hanger consists of a support member with strengthening members and a holding member which extends from both sides of the support member and is positioned near the rear of the hanger. The front of the support member is provided with both a hole and peg which are for hanging plants or other items. A stop block allows the positioning of the support member against the fence. The stop block may be either fixed or adjustable. A mounting block is provided for using the hanger on structural surfaces such as walls.

6 Claims, 7 Drawing Figures

PLANT HANGER

BACKGROUND OF THE INVENTION

This invention relates to hangers and more particularly to hangers for plants and for hanging plants on fences and walls.

A considerable number of plant hangers are known to exist. The existing hangers generally require direct securing of the device to ceilings overhangs or the like. Similarly hangers mounted on vertical members require direct attachment to the vertical member. In either case the plant hangers are not easily relocated. There thus exists a need for a more convenient way to hang plants.

SUMMARY OF THE INVENTION

It is a principle object of this invention to provide a new and improved hanger.

Another object of this invention is to provide a new and improved plant hanger.

It is yet another object of this invention to provide a new and improved plant hanger to mount on a fence.

It is still another object of this invention to provide a new and improved plant hanger to mount on a picket or slat fence.

It is still further object of this invention to provide a new and improved plant hanger to mount on a surface.

It is yet still another object of the invention to provide a new and improved plant hanger that is easy to relocate.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DESCRIPTION OF THE PREFERRED EMBODIMENT

Figure 1:
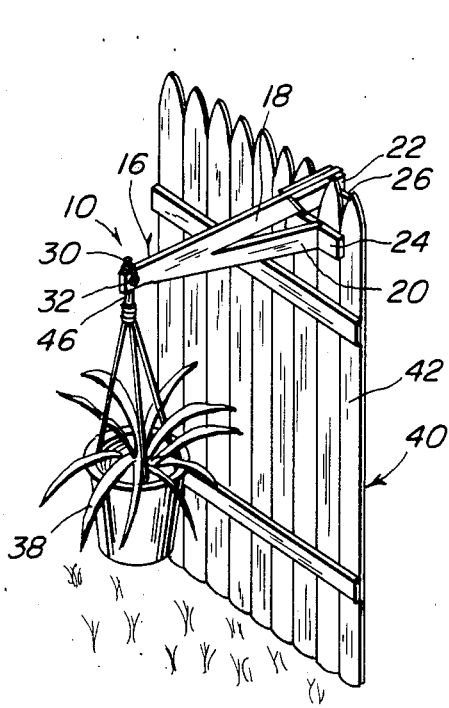
FIG. 1 is a perspective view of the invention in use supporting a hanging plant from a picket fence.
Figure 2:
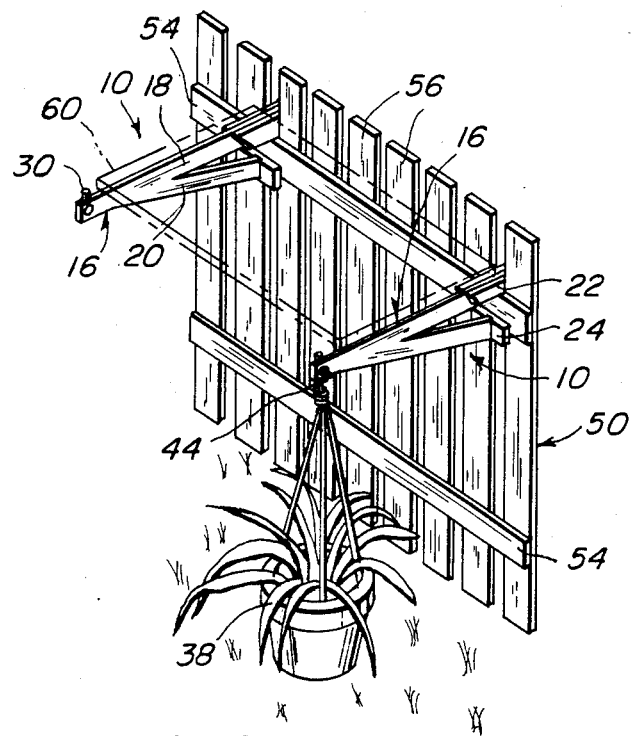
FIG. 2 is another similar perspective view of the invention in use on a slat fence with a shelf illustrated in phantom for clarity being supported there above.
Figure 3:
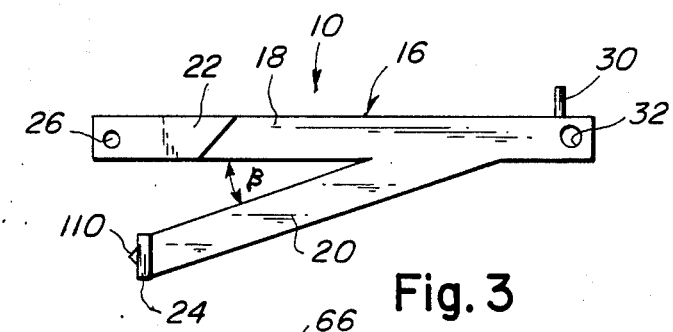
FIG. 3 is a side view of the invention per se.
Figure 4:
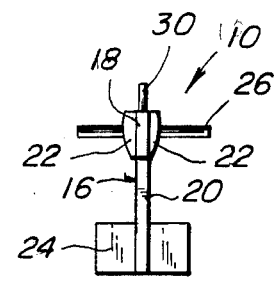
FIG. 4 is an end view thereof.

With references to FIGS. 1 and 2 there is shown a plant hanger 10. Hanger 10 includes a support member 16 with a horizontal portion 18 and an angular portion 20 extending from the bottom of the horizontal portion 18 at an angle $\beta$ as illustrated in FIG. 3. A pair of strengthening members 22 (FIGS. 3 and 4) are attached by conventional means such as glueing, nailing and/or screwing to horizontal portion 18 of support member 16. Strengthening members 22 are attached to each side at the rear of horizontal portion 18 of support member 16. Each strengthening members 22 extend along horizontal portion 18 of support member 16 for a distance less than the full length of horizontal portion 18 of support member 16. A stop block 24 is mounted on the rear end of angular portion 20 of support member 16 and is perpendicular to support member 16. Block 24 is of a selected width which is wider than the thickness of support member 16. A holding member 26 in the form of a peg extends perpendicularly through strengthening members 22 and horizontal portion 18 of support member 16. Holding member 26 may be a circular, square or any other convenient cross section. The components of plant hanger 10 may be constructed of wood, plastic, aluminium or other like material. A peg 30 extends up from horizontal portion 18 and is attached near the front portion thereof and may be made of material and in a configuration similar to that of holding member 26. A hole 32 (FIG. 3) extends through horizontal portion 18 proximate the front thereof of any suitable size and configuration.

Plant hanger 10 is particularly adapted to hang an article such as a plant 38 from a structure such as a fence 40. Holding member 26 is positioned behind a pair of adjacent slats 42 of fence 40 and rest on the rear thereof. Block 24 rests on the front of slats 42. Block 24 may have small optional pointed members 110 protruding from the surface which contacts fence slats 42 in order to prevent the hanger from sliding down the fence slats. Horizontal portion 18 and strengthening member 22 sit on the upper edge of slats 42. A plant 38 is hung on plant hanger 10 by inserting a hook 44 (FIG. 2) through hole 32. Alternatively rope 46 is inserted through hole 32. Other means of hanging plant 38 include looping rope 46 behind peg 30 and placing hook 44 behind peg 30.

In FIG. 2 a fence 50 is shown having a pair of horizontal cross members 54 with separations between slats 56. Plant hanger 10 is mounted on fence 50 in similar manner to that described for FIG. 1 except that horizontal portion 18 and strengthening members 22 rest on cross member 54. A second hanger 10 is mounted in a similar way allowing for the deployment of a shelf 60. Stops 30 prevent shelf 60 from sliding forward.

Figure 5:
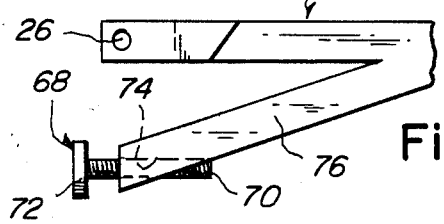
FIG. 5 is a side view of a adjustable modification of the invention.

In the embodiment of FIG. 5 there is shown a portion of a support member 66 which is identical to support member 16 (FIG. 3) except that block 24 of member 16 is replaced by an adjustable block assembly 68. An externally threaded adjusting screw 70 with a block portion 72 is threadably received by an externally threaded opening 74 formed in angular portion 76 of support member 66. The positioned block 72 is adjusted by means of screwing the threads of adjusting screw 70 into and out of hole 74.

Figure 7:
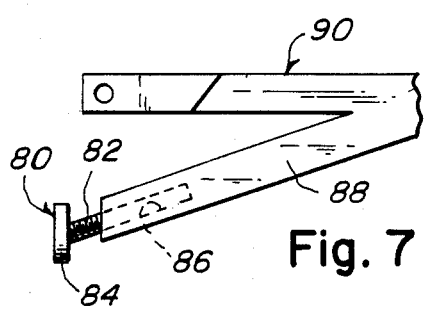
FIG. 7 is a side view of an alternative of an adjustable modification of the invention.

An alternative disposition for a block assembly 80 is shown in FIG. 7. An externally threaded adjusting screw 82 extends at an angel from a block portion 84 thereof to be received into an internally threaded opening 86 that is formed parallel to the centerline of an angular portion 88 of a support member 90 that is otherwise identical to the previously described support members.

Figure 6:
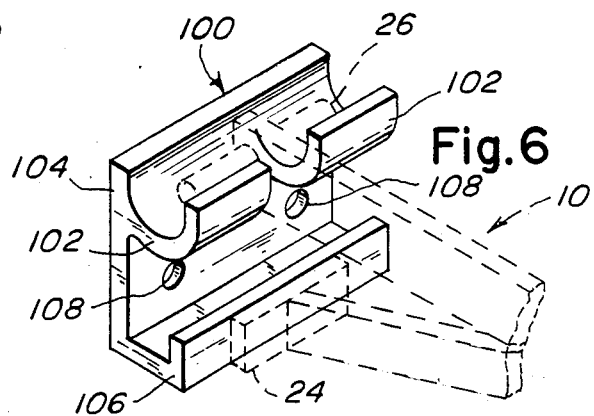
FIG. 6 is a perspective view of a bracket member to be used in combination with the hangers in FIGS. 2 and 5 when it is desired to support a plant and/or shelf from a wall instead of a fence.

In FIG. 6 there is shown a mounting bracket 100 for hanger 10. A pair of spaced holding member receivers 102 are located in spaced relationship proximate the top of a backing plate 104 and are of a configuration to receive holder 26. A ledge 106 extends forward from backing plate 104 and is of a size and configuration to cooperate with block 24 of hanger 10. Ledge 106 would similarly cooperate with block assembly 68 (FIG. 5) or block assembly 80 (FIG. 7). A pair of holes 108 are formed through backing plate 104 for the purpose of mounting bracket 100 to a structure such as a wall.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

what is claimed is:

1. A hanger for an article such as a plant or the like comprising:
   (a) a structural member of first predetermined size and configuration and including opposed sides;
   (b) a holding member of second predetermined size and configuration attached to and extending from said opposed sides of said structural member proximate a first end thereof for hanging said structural member from a support;
   (c) stop means carried by said structural member proximate a second end thereof spaced from said first end to facilitate hanging said structural member on the support; and
   (d) article support means carried by said structural member proximate a third end thereof spaced from both said first end and said second end to receive an article, wherein said structural member includes: a first portion having a substantially horizontal disposition and a second portion extending at a predetermined angle from said first portion and disposed in a same plane as said first portion.

2. The hanger of claim 1, wherein said second portion has disposed at a terminal portion thereof, a stop means essentially perpendicular to it, said stop being essentially a rectangular block.

3. The hanger of claim 1, wherein said second portion has disposed at said terminal portion an adjustable stop, said adjustable stop being adjusted with a screw means attached thereto, adjustment being said screw means accomplish by threading into a threaded hole in said second portion wherein said threaded hole is coincident with the centerline of said second portion.

4. A hanger for an article such as a plant or the like comprising:
   (a) a structural member of first predetermined size and configuration and including opposed sides;
   (b) a holding member of second predetermined size and configuration attached to and extending from said opposed sides of said structural member proximate a first end thereof for hanging said structural member from a support;
   (c) stop means carried by said structural member proximate a second end thereof spaced from said first end to facilitate hanging said structural member on the support;
   (d) article support means carried by said structural member proximate a third end thereof spaced from both said first end and said second end to receive an article;
   (e) a mounting bracket means; and
   (f) said mounting bracket means including; a receiver for the holding member of said plant hanger, a ledge which coasts with said stop and means for mounting said bracket to a structural member such as a wall.

5. The hanger of claim 4, wherein said second portion has disposed at a terminal portion thereof, a stop means essentially perpendicular to it, said stop being essentially a rectangular block.

6. The hanger of claim 4, wherein said second portion has disposed at said terminal an adjustable stop, said adjustable stop being adjusted with a screw means attached thereto, adjustment being said screw means accomplish by threading into a threaded hole in said secondportion wherein said threaded hole is coincident with the centerline of said second portion.

* * * * *